FIG. I

ROBERT D. TALTY
INVENTOR.

ROBERT D TALTY
*INVENTOR.*

United States Patent Office 3,446,633
Patented May 27, 1969

3,446,633
METHOD OF PREPARING AN OIL-TREATED EDIBLE COLLAGEN SAUSAGE CASING
Robert D. Talty, Danville, Ill., assignor to Tee-Pak, Inc., Chicago, Ill.
Filed Mar. 24, 1966, Ser. No. 537,221
Int. Cl. A22c 13/00
U.S. Cl. 99—175                                   5 Claims

ABSTRACT OF THE DISCLOSURE

Edible collagen casing which is highly translucent is prepared by incorporating a small amount of a non-toxic edible food grade oil in one of the treating baths such as the washing bath, plasticizing bath, or tanning bath, used in preparing the casing. Oil, in the amount of about 0.01%, is added to the casing in one of the treating baths and renders the casing highly translucent.

---

Figure 1:
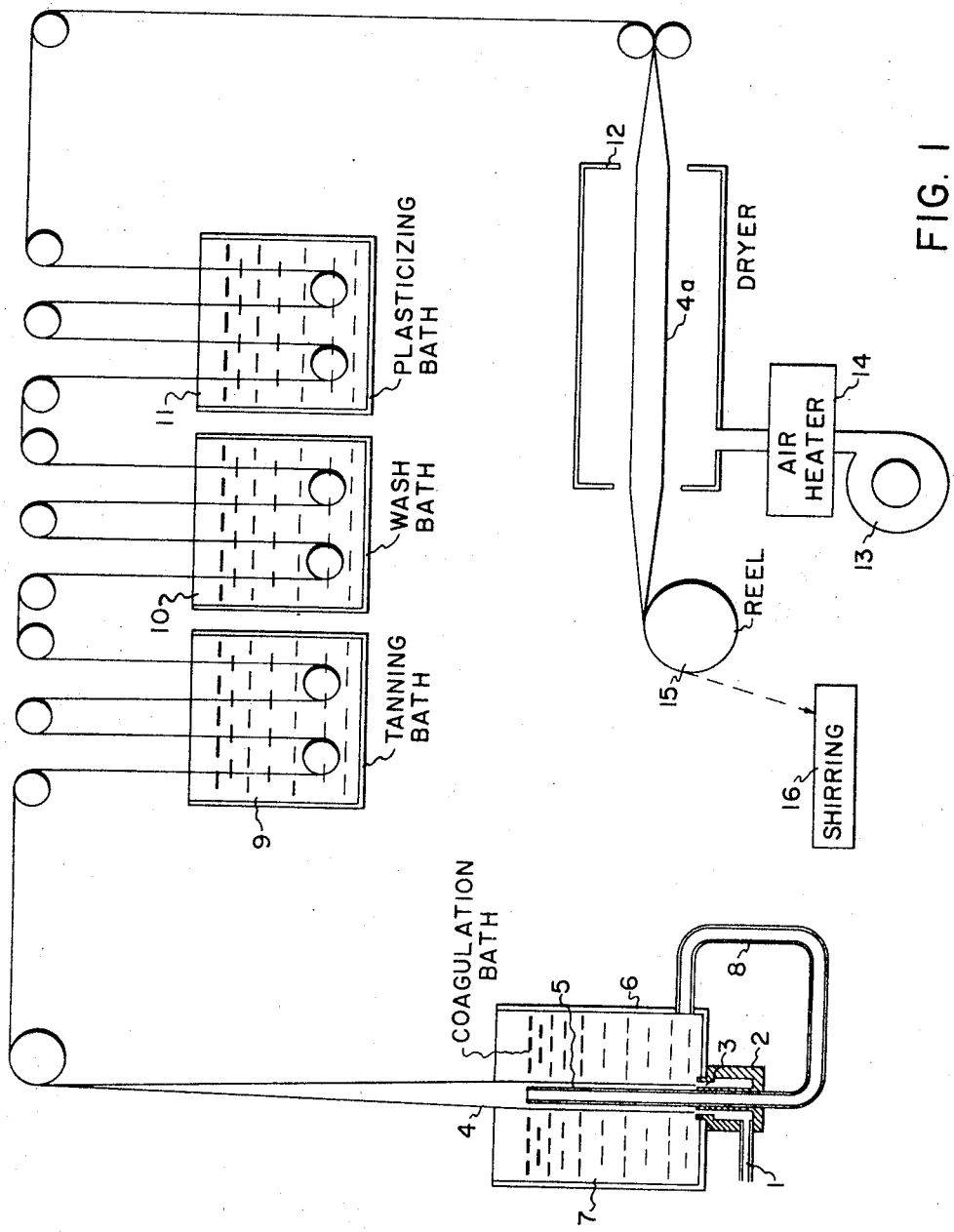

This invention relates to new and useful improvements in edible collagen sausage casings and more particularly to collagen sausage casings which have been rendered transparent by treatment with an oil.

Natural casings are obtained from the intestines of various edible animals, primarily cattle and sheep. The intestines are removed from the slaughtered animal and are thoroughly cleaned by processes well known in the art. The intestines which have been thoroughly cleaned are used as natural casings into which various sausage meat compositions may be stuffed and formed into sausage links in preparation for cooking. The sausages which are thus prepared are cooked by the consumer and the sausage casing eaten with the cooked sausage. In the preparation of certain smoked or precooked sausages, such as frankfurters and the like, the sausage is cooked or smoked or otherwise processed by the meat packer to render it edible without further treatment by the consumer. Other sausages, such as fresh pork sausage, when stuffed and linked in natural casings must be cooked thoroughly by the consumer prior to eating.

Prior to about 1925, substantially all sausage casings were natural casings prepared from animal intestines. Since that time, there have been developed several types of synthetic sausage casings which are used in the preparation of most sausages which are made and sold today. Cellulose casings are used in the preparation of large sausages such as bolognas, salamis and the like, and are removed from the sausage by the consumer at the time of final preparation for eating. Small diameter regenerated cellulose casings are also used in the preparation of frankfurter sausages wherein the casing is stuffed with sausage meat, linked, smoked, and cooked, and the casing removed from the finished sausage. Regenerated cellulose casings have not proved satisfactory for the processing of pork sausages inasmuch as cellulose is not edible along with the sausage and does not transmit the fat which is released from the sausage during cooking. As a result, there has been considerable demand for an artificial sausage casing which is edible and which has the properties desired in a casing to be used in the processing of pork sausages.

Over a period of several years, synthetic sausage casings have been prepared from coarsely processed animal collagen. Casings made of collagen have been prepared by processing animal hides to break the collagen into a fibrous structure and extrude the collagen fibers in the form of a doughly mass to produce tubular casings. The casings which have been prepared in this manner have been hardened by treatment with formaldehyde and have been used as removable casings for processing various sausages. These casings have not been edible even though collagen itself is edible.

Recently, edible sausage casings of collagen have been prepared and sold in commercial quantities in the United States. In the manufacture of edible collagen casings, considerable emphasis has been placed upon the necessity for using collagen source materials which have not been subjected to a liming treatment. In fact, a number of recent patents describing the production of collagen casing have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which collagen is obtained. In the copending patent application of Robert D. Talty and Mauj A. Cohly, Ser. No. 442,885, filed Mar. 26, 1965, a process is described in which edible collagen casings are prepared from limed hide collagen.

In the preparation of edible collagen casings, hide collagen is converted into a finely divided fibrillar form and extruded in the form of a dilute (e.g. 2–6%) collagen slurry. The extruded collagen is passed into a sodium sulfate or ammonium sulfate coagulation bath which dehydrates the collagen slurry and forms a coherent fibrillar collagen film. At this stage in the processing, however, the salt coagulated collagen film can be handled but will revert to a thin slurry upon contact with water. It is therefore necessary to harden or tan the extruded collagen film to permit further processing of the film and to provide the film with sufficient strength for use as a sausage casing. A satisfactory tanning process must utilize a tanning agent which is completely non-toxic in the form in which it is present in the finished casing and must produce a casing of sufficient strength to be stuffed with sausage meat, linked, packaged, and finally cooked.

Collagen casings of the type used in the production of pork sausage links have been subject to the disadvantage that the casings have a parchment-like appearance and do not shown the sausage meat in as attractive a manner as natural casings.

It is therefore one object of this invention to provide a new and improved process for preparation of edible collagen casings.

Another object of this invention is to provide a new and improved edible collagen casing having a highly transparent appearance and prepared by a novel process.

A feature of this invention is the provision of an improved process in which edible collagen casings are prepared and rendered transparent by treatment with an oil.

Another feature of this invention is the provision of a novel oil treated edible collagen casing.

Other objects and features of this invention will become apparent from time to time throughout the specification and claims as hereinafter related.

SUMMARY OF THE INVENTION

This invention is based upon the discovery that satisfactory edible collagen casings can be prepared using either limed or unlimed hides as a source of collagen and rendered highly transparent by treatment with oil. In fact, superior edible casings can be prepared in this manner. The animal hide is treated to remove the blood quickly and is frozen or salt-cured or immediately treated with a lime containing solution to at least partially dehair the hide or swollen with acid and the hair and epidermal layer cut away. If the hide is limed, the liming step (of the fresh, frozen, or salt-cured hide) must be carried out in less than 48 hours and preferably less than 12 hours (e.g. 3 hours or less). The hide is then washed, dehaired, ground at a temperature less than 20° C., and swollen with acid at a pH of 2.5–3.5. These steps are preferably carried out rapidly, viz. in less than 48 hours, preferably less than 12 hours. When the hide is limed, washed, ground, and swollen quickly, as above described, a strong edible casing can be prepared without deliming the casing. A satisfactory casing can also be prepared by using an unlimed hide as the source of collagen or limed hides as a source of collagen followed by acid or detergent deliming. The edible casings which are prepared in this manner are treated with oil during the preparation of the casing to render the casing highly translucent or almost transparent in appearance. The casing which is oil treated yields more attractive sausage links when stuffed with pork sausage and formed into links.

In carrying out this process, the swollen collagen slurry which is produced above is extruded through an annular die into a coagulating bath to form a salt coagulated tube. The tube is then tanned, using a nontoxic rapid tanning agent, washed, plasticized, dried, shirred, and packaged. The shirred casing is used by the meat packer in the preparation of sausages by filling with sausage meat using a conventional stuffing horn and forming the filled casing into suitable sausage links. As noted above, the oil treated casing is more transparent and yields a more attractive sausage.

Figure 2:
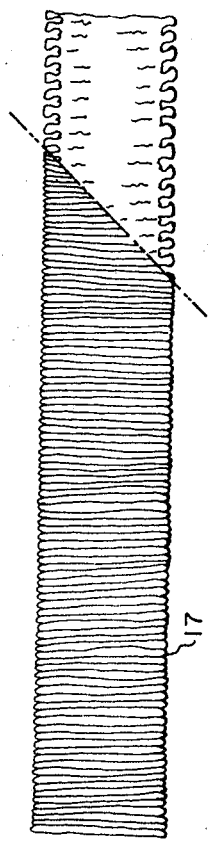
Figure 3:
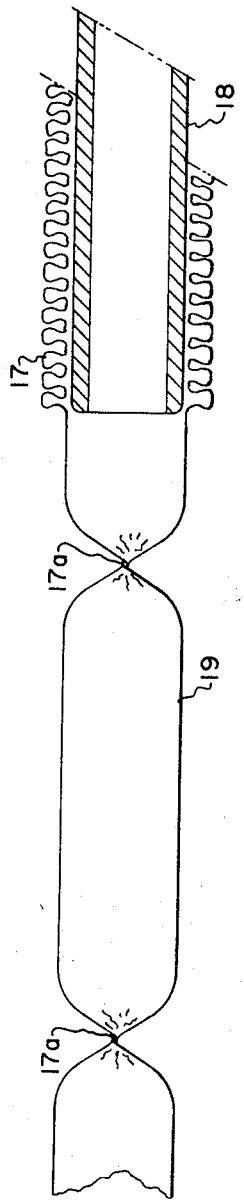

The process for preparation of casings in accordance with this invention will be understood more fully by reference to the following description and the accompanying drawings, in which:

FIG. 1 is a flow diagram illustrating schematically the more important steps in the extrusion, tanning, and processing of edible collagen casings, FIG. 2 is an extruded edible collagen casing prepared in accordance with this invention as processed in a shirred form, and FIG. 3 is a schematic view showing the filling of the casing with sausage meat on an extrusion horn or nozzle and the preparation of sausage links therefrom.

Collagen tissues which are suitable for preparation of extruded collagen casings are obtainable from hide and tendon, although hide collagen is preferred for casing manufacture. Collagen is formed of a large number of fibers which in turn consist of a much greater number of fibrils of submicroscopic size. Collagen fibrils have a diameter of the order of 10–50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar films. More recently it has been found that satisfactory edible collagen casings can be prepared using either limed or unlimed hide as the source material for the preparation of casing.

If unlimed hide is to be used in the preparation of an edible collagen casing, the unlimed hide, either fresh or frozen, is defleshed and the hair and epidermal layer mechanically removed, e.g., by abrading, scraping, splitting, etc. The hide is then cut into small pieces and passed through a meat grinder until reduced to a very small size. The ground collagen is then swollen in a solution of an organic acid such as lactic acid or citric acid to produce a slurry having a 3–6% collagen content.

The collagen slurry is extruded through an annular die into a coagulating bath consisting of a concentrated solution of sodium sulfate or ammonium sulfate. The resulting tubular collagen film is then passed into a hardening or tanning bath consisting of a ferric or aluminum salt (preferably in an olated form), an edible aldehyde, vegetable tannin, such as tannic acid, or the like. The hardened or tanned casing is then washed, dried, shirred, and packaged.

If the collagen to be used in the preparation of an edible casing is derived from limed animal hides, some variation in the above noted procedure is required. An animal side is treated to remove the blood quickly and cut into suitable pieces (hide trimmings may also be used) for the subsequent liming treatment. The hide pieces are treated with a suitable lime solution for removal of hair. The lime solution may be simply a saturated solution of lime containing excess solid lime, or may be a solution containing excess solid lime together with sodium sulfhydrate and dimethylamine sulfate. After treatment in such a solution for a period of less than 2 days (3–12 hours or less is preferred), the hides are removed and washed. After washing, the hides are split or otherwise mechanically abraded to remove the epidermal layer and any remaining hair. If desired, the hide may be neutralized by treatment with a nontoxic acid, at a pH of about 2.5–6.5, to form soluble calcium salts. The neutralized hide is washed sufficiently to remove most of the by-product salts. The hide may be split or mechanically dehaired to remove residual hair and the epidermal layer either before or after neutralization. Next, the treated hide is defleshed, cut into small pieces, and then ground at a temperature less than about 20° C. into a finely divided form and mixed with sufficient water to produce a slurry having a collagen content in the range from about 2–6%, preferably about 3.5–5%.

The collagen slurry which is thus produced is treated with a weak acid such as citric acid or lactic acid to cause the collagen fibers to swell and burst, thus releasing the collagen fibrils and destroying the identity of the individual fibers. The best results are obtained by carrying out the washing, dehairing, grinding, and acid-swelling of the collagen in less than 48 hours and preferably less than 12 hours.

The swollen collagen slurry is then extruded through an annular die to produce a thin walled product suitable for use as sausage casings after tanning and further processing. In order to obtain maximum strength in the product casing, the collagen slurry is preferably extruded through a die having rotating inner and/or outer parts, which is well known in the prior art in the preparation of collagen casings, as shown in Becker U.S. Patent 2,046,541.

The collagen slurry is extruded through the die into a coagulating bath consisting of a concentrated solution of sodium sulfate or ammonium sulfate. The thin wall collagen tube which is formed in the coagulating bath is then passed into a tanning or hardening bath, viz a solution of a ferric salt or an aluminum salt (preferably in an olated form), edible aldehyde, vegetable tannin, or the like, and subsequently washed and plasticized. The casing which is thus prepared is inflated with air or other gas and passed through a dryer. From the dryer, the casing is either rolled up on reels or is passed on to the shirring machine where it is shirred into short strands as illustrated in FIG. 2 of the drawings. The casing may be shirred on machines of the type shown in Blizzard et al. U.S. Patent 2,722,714; 2,722,715; 2,723,201; or Ives U.S. Patent 3,122,517.

In FIG. 1 of the drawings, the steps from extrusion through reeling or shirring are illustrated schematically in slightly more detail. The collagen slurry is introduced through inlet conduit 1 into die 2 having an annular die outlet 3 through which casing 4 is extruded. The die 2 has an inner tube 5 which extends upwardly within the extruded casing to remove coagulating bath from within the extruded casing. The die 2 is located at the bottom of container 6 which contains a coagulating bath 7. Coagulating bath 7 is circulated through conduit 8 from tube 5 for removal of the coagulating bath from inside the extruded casing. Casing 4 which is coagulated in the bath 7 passes over a series of rollers and is directed through a tanning bath 9.

Tanning bath 9 consists of an aqueous solution of any suitable nontoxic tanning agent (e.g., vegetable tannins, nontoxic edible aldehydes, such as, glutaraldehyde, and the aldehydes present in smoke condensates, aluminum and ferric salts (preferably in an olated form)).

From tanning bath 9, the casing passes through a wash bath 10 which unreacted tanning reagent is washed out of the casing. The casing is then passed through plasticizing bath 11 which introduces a small amount of a plasticizer such as glycerin into the casing. From plasticizing bath 11, the casing passes through dryer 12 where it is inflated as indicated at 4a and dried with air or other gas circulated by fan or blower 13 through air heater 14.

After leaving dryer 12, the casing 4 may be collapsed and rolled up on reel 15 from which it is subsequently removed for shirring. In an alternate embodiment of this process the casing is passed directly to a shirring machine shown diagrammatically as 16. The shirring machine which is used for preparation of shirring strands of casing may be of any suitable design such as the types commonly used in the shirring of regenerated cellulose sausage casings as noted above.

After the casing is shirred into individual short strands, it is packaged and cured by heating at 60°–80° C. in an atmosphere of 20–50% relative humidity for several hours prior to shipment to the meat packer. In FIG. 3, the stuffing of the casing is illustrated. A strand of edible collagen casing 17 (also shown in detail in FIG. 2) is placed on a tubular stuffing horn 18 which is connected to a pressurized source of sausage emulsion (not shown). The sausage emulsion is passed through the stuffing horn 18 into the end of casing 17 and the casing is filled with sausage meat and twisted at suitable intervals, as indicated at 17a, to provide sausage links 19. The links may be severed from each other and packaged in a suitable overwrap following conventional meat packaging techniques. When the sausage is cooked by the consumer, the casing is found to be quite strong and shrinks with the meat during cooking. The casing may be prestuffed, if desired, to permit more rapid release of fat during the cooking of the sausages. Casing which is prepared in this manner has been found to have a shrinkage temperature which is equal to or greater than native collagen and thus does not shrink excessively during cooking.

In carrying out this process, it was found that the incorporation of a small amount of an edible oil, such as mineral oil, or vegetable or animal oils, in the casing result in the production of a casing which is strong and highly translucent (almost transparent). The amount of oil required for this purpose ranges from about 0.0001 to 2.0% by weight of the casing. The oil may be applied at any point in the production of the casing. Thus, the oil may be emulsified into the tanning bath or the wash bath or plasticizing bath as illustrated in FIG. 1.

The following nonlimiting example is illustrative of the application of this invention to the preparation of a satisfactory translucent or transparent edible collagen casing:

Example 1

In this example, a preparation of edible collagen casings from limed animal hides is described. Frozen steer hides are thawed and limed for a period of 6 hours at 10° C. in a liming solution equal to 400% of the weight of the hide being treated. The liming solution contains 5% lime, 1% sodium sulfhydrate, and 3% dimethylamine sulfate, based on the weight of the hide treated. At the end of the 6-hour treatment, the hair is substantially loosened and partially removed from the hide. The hide is then washed to remove excess liming solution, defleshed, and split to remove the remaining hair and epidermal layer.

Next, the limed and washed hide splits are cut into small square or rectangular sections in preparation for grinding. The small pieces of treated hide are converted to a fine pulp by successive passes through a meat grinder. In this grinding operation, sufficient ice is mixed with the hide splits to maintain the temperature below about 10° C. Successive passes through the meat grinder use successively smaller dies, the smallest being 3/64 inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored at least 1 hour at a temperature of 10° C. to swell. At the end of this time, the collagen has swollen and taken up all of the water in the slurry. The swollen collagen is admixed with additional water and acid to produce a thin homogeneous paste containing 4% collagen and 1.2% lactic acid (to maintain a pH of 2.5–3.7%). This paste is further homogenized, filtered to remove any solid contaminants, and deaerated. The process, from washing of the limed hide through the acid swelling of the comminuted collagen, is carried out in a period of about 6–12 hours (and in no event longer than 48 hours).

The slurry is then pumped under pressure through an extrusion die into a coagulating bath consisting of 35% ammonium sulfate (sodium sulfate can also be used) in water. When the collagen is extruded as a thin walled tube into this concentrated solution of ammonium sulfate, the collagen fibrils are dehydrated and collapse to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

From the coagulation bath, the casing next passes into a tanning bath which comprises a solution of 3% glutaraldehyde, having an initial pH of 5.0. The casing passes over a series of rollers in the glutaraldehyde solution to provide multiple passes giving a residence time of about 3 minutes in the bath. From the tanning bath, the casing then passes into a wash bath where it is maintained for a period of about 10 minutes by a multiple pass arrangement. After washing, the casing passes through a plasticizing bath consisting of 5% glycerin in water and containing about 5% food grade mineral oil emulsified throughout the solution. In the plasticizing bath, containing mineral oil, the casing is plasticized with glycerin and absorbs a small amount of mineral oil which is sufficient to render the casing highly translucent (almost transparent) after drying.

From the plasticizing bath, the casing passes through a dryer where it is inflated with compressed air and dried by circulation of heated air over the surface of the inflated casing. The casing is dried by air maintained at a temperature of 65° C. circulated at a rate of about 250 feet per minute.

After drying, the casing is preferably shirred (since this permits introduction of air to maintain the casing inflated in the dryer) or may be first wound up on reels and subsequently shirred prior to packaging.

Casings made by the above described method are uniform in diameter and wall thickness. The casing is formed of a smooth film which is substantially free of collagen fibers of macroscopic size. The casing film is highly translucent (almost transparent) and apparently formed of collagen fibrils that are essentially randomly oriented. The orientation of collagen fibrils in the film and the resulting relative variation in longitudinal and transverse strength is largely a function of the conditions of extrusion and the type of extruder used. The high degree of translucency of the product is attributed almost entirely to the oil which is absorbed from the oil emulsified in the plasticizing bath.

The casing prepared as described above could be shirred without difficulty using a shirring machine of the type used for shirring of regenerated cellulose casing. The shirred casing could be stuffed, linked, and cooked, without difficulty.

The casing made by the above described method is uniform in diameter and in wall thickness. The casing is formed of a smooth film which is substantially free of collagen fibers of macroscopic size. The casing film is highly translucent (almost transparent) and apparently formed of collagen fibrils that are essentially randomly oriented. The orientation of the collagen fibrils in the film and the resulting relative variation in longitudinal and transverse strength is largely a function of the conditions of extrusion and the type of extruder used. The shirred casing could be stuffed and linked and cooked without difficulty.

What is claimed is:

1. A method of preparing an edible tubular collagen sausage casing which comprises treating a fresh or frozen or salt-cured animal hide, either limed or unlimed, to remove the epidermal layer and hair therefrom, grinding the hide at a temperature less than about 20° C. to produce a slurry of finely divided collagen in water, treating the slurry with acid at a pH of 2.5–3.7 to swell the collagen, extruding the slurry through an annular die to form a collagen tube, immersing the extruded tube in a coagulating bath, tanning the collagen tube, washing, plasticizing, and drying the tube to produce a non-fibrous edible casing, and treating the extruded tube in one of the treating baths subsequent to extrusion but prior to drying with a nontoxic edible food grade oil in an amount ranging from 0.0001 to 2% by weight of the casing to render the casing highly translucent without loss of strength.

2. A method as defined in claim 1 in which the oil is added to the casing during the tanning step.

3. A method as defined in claim 1 in which the oil is added to the casing during a wash step.

4. A method as defined in claim 1 in which the oil is added to the casing during the plasticizing step.

5. A method as defined in claim 1 in which the oil is an edible mineral oil or vegetable oil or animal oil.

References Cited

UNITED STATES PATENTS

| | | |
|---|---|---|
| 3,123,653 | 3/1964 | Lieberman. |
| 3,222,192 | 12/1965 | Arnold et al. _____ 99—176 |
| 3,235,641 | 2/1966 | McKnight. |
| 3,266,911 | 8/1966 | Clement _____ 99—176 |
| 3,269,851 | 8/1966 | Tu. |

HYMAN LORD, *Primary Examiner.*

U.S. Cl. X.R.

99—176